June 11, 1968

J. A. HENSON 3,387,442

NUT HARVESTING MACHINE

Filed April 1, 1965

James A. Henson
INVENTOR.

June 11, 1968  J. A. HENSON  3,387,442
NUT HARVESTING MACHINE
Filed April 1, 1965  7 Sheets-Sheet 3

James A. Henson
INVENTOR.

June 11, 1968

J. A. HENSON 3,387,442

NUT HARVESTING MACHINE

Filed April 1, 1965

James A. Henson
INVENTOR.

United States Patent Office 3,387,442
Patented June 11, 1968

3,387,442
NUT HARVESTING MACHINE
James A. Henson, Box 52, Chetopa, Kans. 67336
Filed Apr. 1, 1965, Ser. No. 444,688
13 Claims. (Cl. 56—328)

ABSTRACT OF THE DISCLOSURE

A pick-up housing is moved over the ground to draw in a crop of nuts lying on the ground by a ground and housing wall wiping action of flexible rotor blades. The crop is conveyed from the pick-up housing through a size sorting tumbler removing undesired debris. From the tumbler, the crop passes through a combing zone removing remaining debris before it is deposited into an elevator and carried toward a collection bin.

This invention relates to agricultural machines and more particularly to a vehicle-propelled harvester for crops lying on the ground, such as nuts.

The nut harvesting machine of the present invention is primarily designed to harvest crops such as nuts lying on the ground by means of a pick-up implement at the forward end of the machine. The crop is transferred without damage to a conveyor by means of a novel action in the pick-up implement, the conveyor moving the crop through a screening assembly for removal of undesired matter picked up with the crop. After being initially screened in the screening assembly, the crop is deposited into a gravity feed chute within which it is further separated from remaining undesired matter. Thus, when the crop is completely separated from the undesired matter, it is delivered to the lower end of a rearwardly extending elevator from which the crop is discharged into a bin located at the rear end of the harvesting machine.

One of the important objects of the present invention therefore, is to provide a harvester of the aforementioned type having a pick-up implement which utilizes a rotor assembly similar to and interchangeable with a rotor assembly such as disclosed in my prior Patent No. 3,128,-729. The rotor assembly cooperates however in the installation of the present invention to effect a novel pick-up action including the wiping of the crop and upward movement thereof off the ground by air flow and a flipping action.

A further object of the present invention is to provide a harvester having a novel screening assembly through which the crop and undesired particles are conveyed. The screening assembly initially removes lighter particles by a directed air flow followed by tumbling of the crop through a tilted screening drum also provided with internal combing fingers for removal of undesired matter of a certain character.

As an additional object of the present invention, the harvester employs additional facilities for removal of undesired matter from the crop before it is rearwardly transferred to the loading bin. Thus, the crop while being transferred to the inlet end of the elevator, is further combed for removal of undesired particles by movement of combing fingers on a combing drum through the stream of particles being fed to the elevator.

A still further object of the present invention is to provide a harvester having an unloading bin into which the crop is deposited, facilities being provided for raising the bin from a lowered position to facilitate unloading thereof while maintaining a lower height for the harvester when in operation.

Other objects of the present invention are to provide a harvester featuring a novel conveyor and elevator structure which avoids damage to the crop by preventing the crop from becoming wedged or accumulating at locations likely to cause damage thereto. The harvester also features an adjustable, self-levelling mounting arrangement for the pick-up implement disposed forwardly of the traction wheels of the vehicle on which the harvester is mounted so as to avoid damage to the crop by the vehicle wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now to the drawings in detail, the harvesting machine is generally denoted by reference numeral 10 as viewed in FIGURES 1 through 5. The harvesting machine involves a self-propelled vehicle including a vehicle chassis 12 supported at its forward end by a pair of powered traction wheels 14 and at its rear end by a dirigible steering wheel 16. The vehicle chassis therefore supports a power plant such as an internal combustion engine 18 disposed rearwardly of the operator's station 20, the engine 18 being provided with a forwardly extending output shaft connected to a universally connected drive shaft 22 journalled at its forward end on a differential axle tube 24 through which the traction wheels 14 are rotatably mounted and driven. Accordingly, the traction wheels are driven by a differential the input of which is drivingly connected to the drive shaft 22 by the belt drive 26. The belt drive 26 is selectively rendered operative and inoperative by means of a belt tensioning device 28 under control of the operator whereby the vehicle may be propelled under control of the operator. The continuously rotating drive shaft 22 is also drivingly connected by the belt drive 30 to a forwardly extending power take-off shaft 32 by means of which the operating components of the harvesting machine may be powered. The shaft 32 is therefore universally connected at its forward end to the input shaft of a second differential unit 34 having laterally extending axle tubes 36 vertically disposed above a pick-up assembly generally referred to by reference numeral 38. The differential unit 34 is thereby operative to differentially drive opposite axial ends of the pick-up assembly by means of a pair of downwardly extending sprocket drives 40 and 42. The differential output adjacent the sprocket drive 40 may also power a blower device 44 by means of the belt drive 46. Belt drives 48 and 50 may also be provided at the output end of the differential unit adjacent the sprocket drive 42 so as to respectively power a combing drum assembly 52 and an elevator device 54. A belt drive 56 may also be provided adjacent the sprocket drive 40 for powering a laterally extending conveyor chain 58 which is entrained about a relatively small sprocket wheel 60 at one lateral side of the harvester and about a larger sprocket wheel 62 at the other lateral side of the harvester. A belt drive 64 may drivingly interconnect the conveyor chain drive to a rotatable screening assembly generally referred to by reference numeral 66. It will, of course, be appreciated that other drive arrangements for the various powered components of the harvester may be utilized in order to operate said components as will be hereafter explained.

Figure 1:
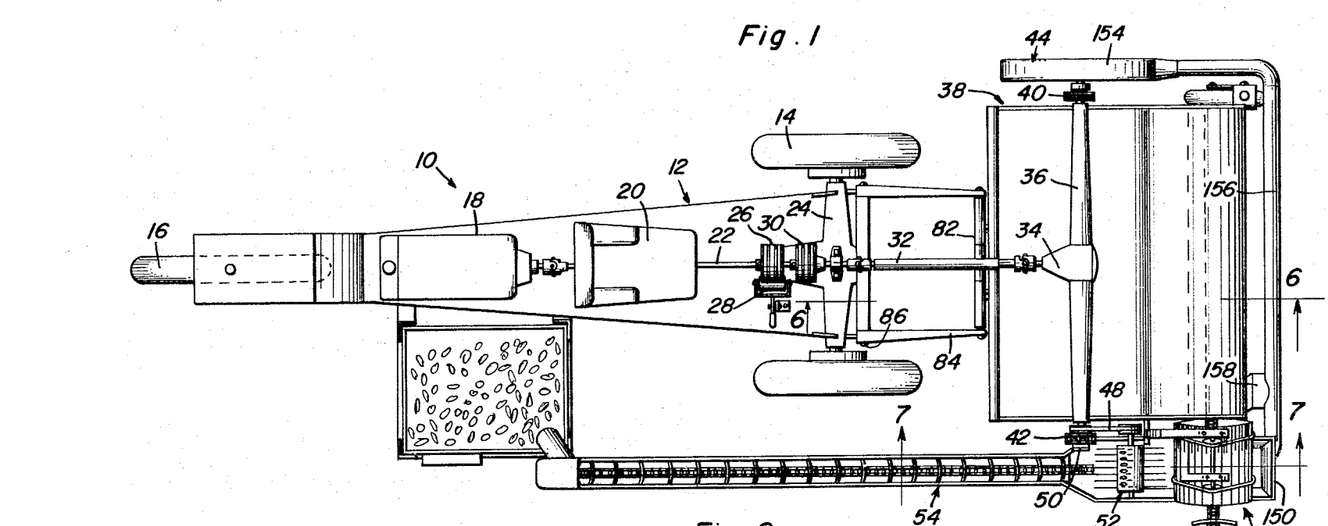
FIGURE 1 is a top plan view of the harvesting machine.
Figure 2:
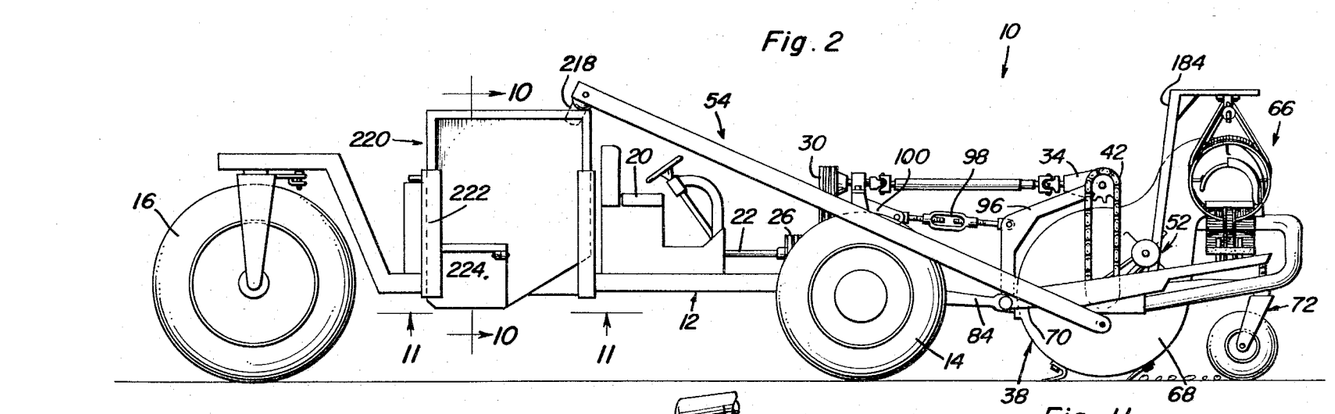
FIGURE 2 is a side elevational view of the harvesting machine.
Figure 3:
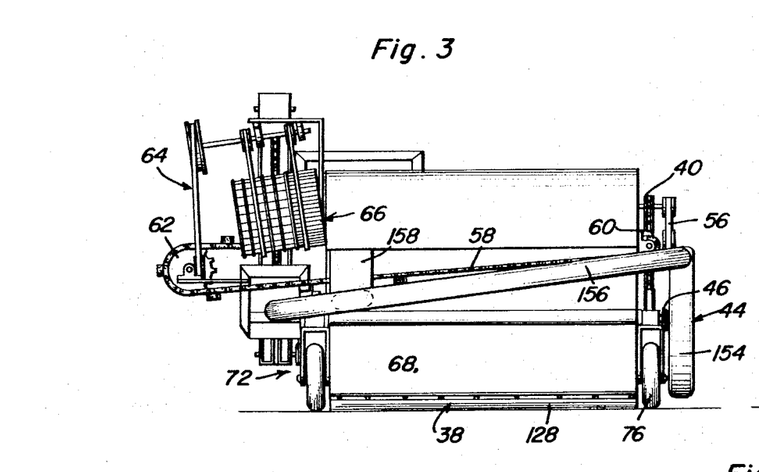
FIGURE 3 is a front elevational view of the harvesting machine.
Figure 4:
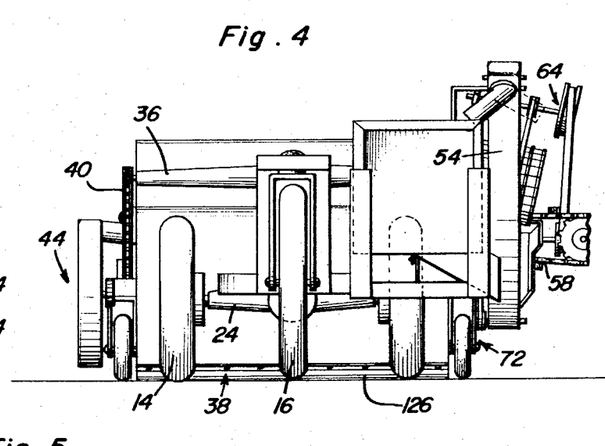
FIGURE 4 is a rear elevational view of the harvesting machine.
Figure 6:
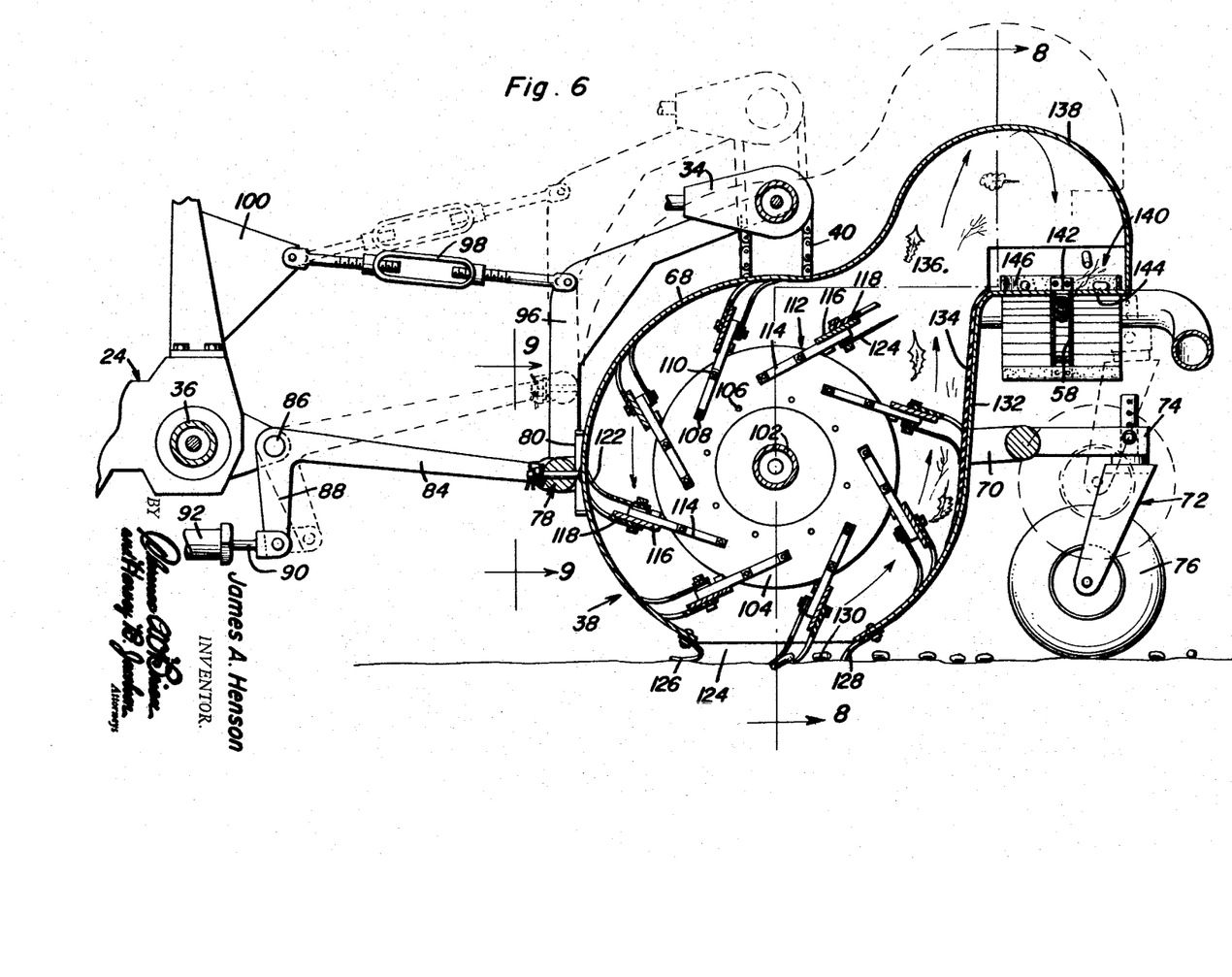
FIGURE 6 is an enlarged partial sectional view taken substantially through a plane indicated by section line 6—6 in FIGURE 1.
Figure 9:
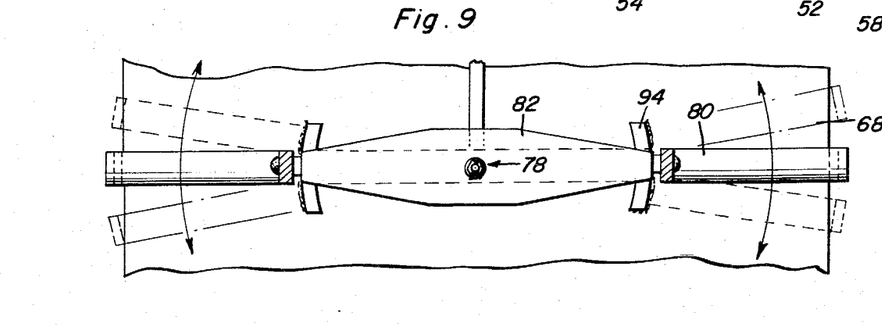
FIGURE 9 is an enlarged partial sectional view taken substantially through a plane indicated by section line 9—9 in FIGURE 6.

As more clearly seen in FIGURES 2, 3 and 6, the pick-up assembly 38 includes a laterally elongated housing 68 disposed forwardly of the forward traction wheels 14 so as to pick up the crop lying on the ground before it is damaged by the wheels. A pair of side frame members 70 are secured to the axial ends of the housing 68 and are pivotally connected to a pair of laterally spaced castor wheel assemblies 72 by means of vertically adjustable connecting arms 74. The castor wheel assemblies are provided with balloon-type tires 76 so as to provide wheel support for the forward portion of the pick-up assembly and yet avoid undue damage to the crop lying on the ground. The rear end of the housing 68 on the other hand, is supported by means of a central hinge assembly 78 which extends rearwardly from a cross frame member 80 interconnected between the side frame members 70 to which the housing is secured. As more clearly seen in FIGURES 1 and 9, the central hinge assembly 78 establishes a horizontal pivotal axis about which the housing 68 and the castor wheel assemblies supporting the forward side thereof, may tilt laterally in accordance with the irregularities of the ground. Accordingly, the hinge assembly pivotally connects the housing to a rocker arm 82, the lateral ends of which are pivotally connected about an axis perpendicular to the central axis of the hinge assembly 78 to a pair of lift arms 84 whereby the vertical position of the central hinge assembly 78 may be adjusted. Each of the lift arms 84 are pivotally mounted by pivots 86 at the forward end of the vehicle between the drive wheels 14. The lift arms are also provided with downwardly depending actuating arms 88 to which a piston rod 90 is pivotally connected. The piston rod 90 extends from a hydraulic actuating cylinder 90 so that valve controlled means (not shown) may be employed to adjust the vertical position of the lift arms and the pick-up housing 68 pivotally supported by the hinge assembly 78 carried by the left arms. It will therefore be apparent, that the pick-up housing 68 is floatingly supported for self-levelling purposes and the cross frame member 80 secured thereto may be provided with a pair of arcuate wear guides 94 as shown in FIGURE 9 engaged by the ends of the rocker arm 82 in order to guide lateral swinging movement of the housing so that the bottom thereof will be spaced from but conform to the ground surface over which it is being pushed by the vehicle. Also secured to the rear side of the housing is an upwardly extending frame member 96 on which the differential drive unit 34 is supported. The turnbuckle device 98 pivotally interconnects the frame member 96 with the vehicle by means of the bracket 100 secured to the differential housing 24 in order to complete the linkage supporting the housing in close spaced relation above the ground. Thus, the horizontal position of the housing 68 may be adjusted by the turnbuckle device 98 for any vertical position to which the housing is adjusted by the lift arms 84. The ground seals 126 and 128 are thereby maintained in a properly flexed condition engaging the ground for purposes to be hereafter explained.

Figure 8:
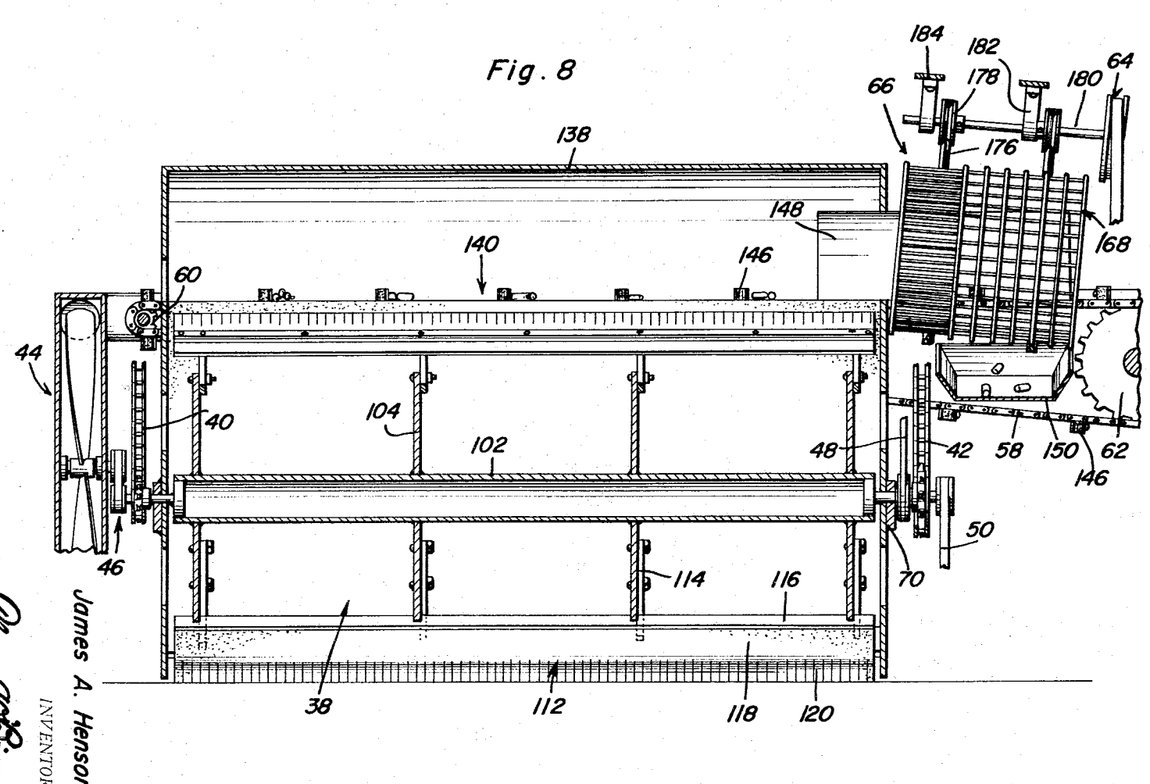
FIGURE 8 is a sectional view taken substantially through a plane indicated by section line 8—8 in FIGURE 6.

Referring now to FIGURES 6 and 8, it will be observed that the housing 68 rotatably mounts a rotor shaft 102 connected at its opposite axial ends of the sprocket drives 40 and 42 for powered rotation thereof within the housing. Secured to the rotor shaft 102, are a plurality of axially spaced rotor discs 104 having three radially spaced rows of apertures 106, 108 and 110. These apertures are adapted to receive fastener elements by means of which each rotor disc mounts a plurality of blade assemblies 112 in one of three positions extending either radially from the rotor discs or inclined in either rotational direction from the radial position. Accordingly, the rotor assembly including the rotor shaft 102 and the rotor discs 104, may be employed for different purposes depending upon the type and positioning of the blade assemblies as described in the aforementioned Patent No. 3,128,729. However, in accordance with the present invention, the blade assemblies 112 are inclined from the radial position in a trailing direction as viewed in FIGURE 6 wherein the rotor assembly is shown as rotating in a counterclockwise direction.

With continued reference to FIGURES 6 and 8, it will be observed that each of the blade assemblies includes an elongated mounting member 114 secured to each of the rotor discs 104 by means of fasteners 108 and 110 extending through radially inner and outer apertures in the rotor discs angularly spaced from each other. The mounting members 114 on the respective discs, are interconnected on the leading side by a rigid plate member 116 to which a primary blade element 118 is secured. The primary blade element 118 is made of flexible material and is formed with slit end portions 120 to facilitate its flexing as it wipingly engages nuts on the ground and the walls of the housing 68 in response to rotation of the rotor assembly. Also secured between the mounting members on the trailing side thereof is a secondary blade element 122 which is also made of flexible material and slit at its end portion to facilitate flexing thereof. The secondary blade element however, extends radially beyond the primary blade element by a small amount and is not as stiff as the primary blade element.

As more clearly seen in FIGURE 6, a laterally extending inlet opening 124 is formed in the housing 68, the inlet opening being sealed above the ground by means of the flexible seal elements 126 and 128 secured to the housing for wiping engagement with the ground and anything lying thereon such as the nuts or crop being harvested. Thus, rotation of the rotor assembly and the blade elements mounted thereon will be effective to induce a vacuum pressure at the inlet opening 124 in order to augment upward displacement of the crop or nuts 130 into the housing. As shown, the seal element 128 extends rearwardly at an angle from the forward wall portion 132 of the housing 68 to present a ramp surface supporting nuts displaced upwardly by the blade elements while allowing nuts to pass under it because of its flexibility during forward movement of the housing. Also, the longer secondary elements are arranged to provide a wiping action which will dislodge and roll nuts from depressions in the ground. Accordingly, the nuts as well as other loose solid matter will be conveyed upwardly through the housing by the blade assemblies and the suction pressure produced as the blade assemblies wipingly engage the walls of the housing. As the blade assemblies move upwardly along the forward wall portion 132, maximum flexing of the primary blade elements occur when they engage the resilient lining 134. Thus, the primary blade elements are arranged to abruptly leave wiping contact with the lining 134 at the outlet portion of the housing 68 in order to produce a flipping action hurling the solid matter being upwardly conveyed, through the outlet 136 into the chamber formed by the curved roof wall 138 above the lateral conveyor assembly 140.

The lateral conveyor assembly includes the aforementioned conveyor chain 58 entrained about the sprocket wheels 60 and 62 which are mounted outside of the chamber formed by the curved roof 138. The upper run of the conveyor chain is disposed in a horizontal position so that it may extend through a laterally extending slot 142 formed in the floor 144 of the chamber enclosed by the curved roof 138. Accordingly, the upper run of the conveyor chain will displace a plurality of rearwardly curved resilient pusher elements 146 toward a discharge location adjacent the larger sprocket wheel 62 as viewed in FIGURE 8. The curvature of the pusher elements 146 is therefore adapted to prevent accumulation of the solid matter, being laterally conveyed, at the ends of the pusher element in order to avoid damage thereto by wedging against the side walls of the chamber. The crop as well as undesirable material, discharged from the pick-up assembly into the conveyor chamber, will therefore be laterally displaced by movement of the conveyor chain 58 through an outlet hood 148 which extends laterally from the conveyor chamber formed by the curved roof 138. The solid matter is thereby pushed into the screening assembly 66 from which the crop is dropped into the upper inlet end of a gravity feed chute 150 below which the lower run of the conveyor chain 58 extends.

Figure 5:
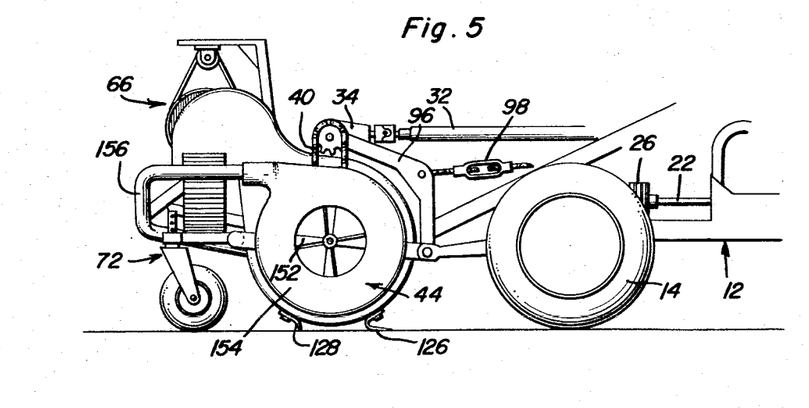
FIGURE 5 is a partial side elevational view of the harvesting machine from a side opposite the side viewed in FIGURE 2.
Figure 17:
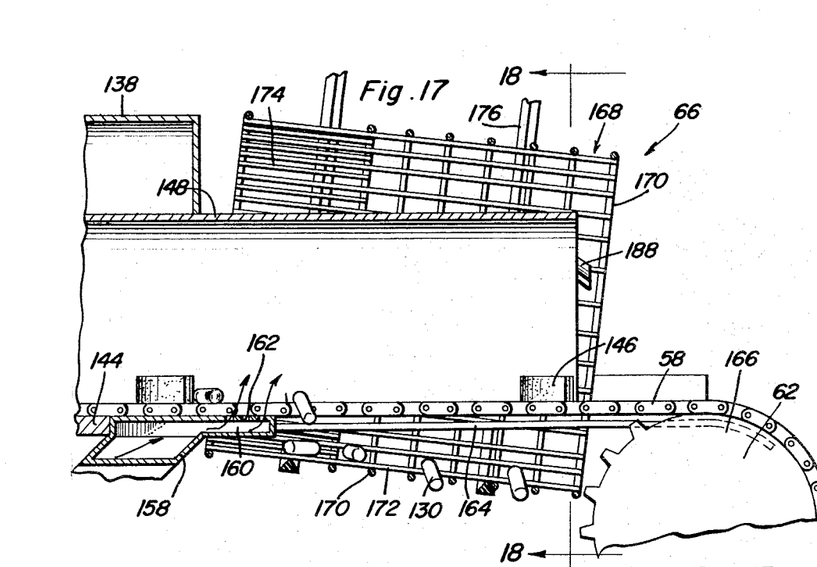
FIGURE 17 is an enlarged partial sectional view taken substantially through a plane indicated by section line 17—17 in FIGURE 7.
Figure 18:
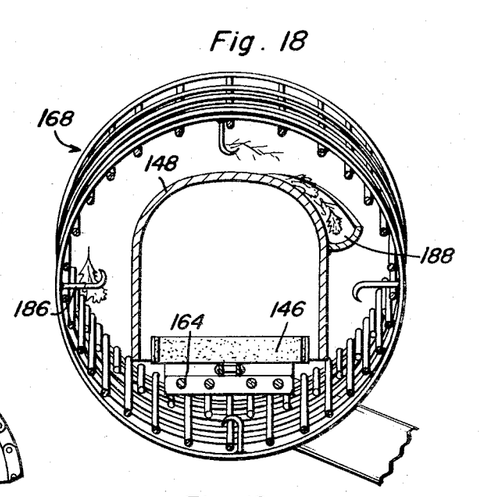
FIGURE 18 is a partial sectional view taken substantially through a plane indicated by section line 18—18 in FIGURE 17.

The blower device 44 as shown in FIGURE 5, includes a fan blade 152, rotation of which induces an axial inflow into the fan housing 154 to discharge air under pressure into the conduit 156 which extends from the fan housing laterally in front of the pick-up assembly. Connected to the conduit 156 is an outlet duct 158 terminating in a manifold portion 160 over which the conveyor chain and pusher elements 156 pass as shown in FIGURE 17. The manifold portion 160 is provided with a plurality of apertures 162 through which a plurality of air jets emerge directed upwardly and forwardly through the hood 148. Accordingly, lighter material such as leaves and small sticks, will be carried by the air flow produced by operation of the blower device 44 out of the hood 148 and discarded. The heavier particles including the nuts 130, continue to be displaced by the pusher elements 146 along a plurality of spaced rod elements 164 as shown in FIGURES 17 and 18 so that undesired particles such as long sticks, will be discharged at the curved end portions 166 of the rods and discarded. The nuts 130 however, will drop between the rods into the screening assembly.

As shown in FIGURES 8, 17 and 18, the screening assembly includes a tumbling drum 168 formed by a plurality of axially spaced circular rod elements 170 interconnected by axially extending straight rod elements 172 to form a forward screening portion having apertures through which the nuts 130 drop while larger sized particles are retained therein. Additional rod segments 174 are mounted on the tumbling drum 168 to form a rear screening portion with smaller apertures which prevent the nuts 130 from dropping therethrough. The tumbling drum is therefore rotated at a relatively slow tumbling speed about an axis which is tilted downwardly toward the discharge location of the conveyor 140 in order to cause the solid matter deposited into the tumbling drum to move toward the discharge location. It will therefore be apparent that small articles such as dirt will drop through the rear screening portion of the tumbling drum to be discarded while the nuts 130 will drop only through the forward screening portion of the tumbling drum. Larger sized particles on the other hand, will be ultimately discharged from the tumbling drum. The tumbling drum is therefore rotationally supported by suspension drive belts 176 entrained about spaced pulley wheels 178 secured to a drive shaft 180. The drive shaft is supported by hanger journals 182 from a supporting frame 184 secured to the pick-up assembly housing. Thus, the drive shaft 180 will be positioned at the proper inclination to support the tumbling drum 168 for rotation about the inclined axis aforementioned. Further, the forward screening portion of the tumbling drum will be positioned above the inlet end of the gravity feed chute 150 so that the nuts may be collected therein. It will also be observed, that the tumbling drum is provided with a plurality of circumferentially spaced combing fingers 186 as more clearly seen in FIGURE 18, which project radially inwardly. Accordingly, larger particles passing axially through the tumbling drum, will be picked up and displaced into a spiral chute 188 secured to the outside of the hood 148 from which such material is discharged and discarded. The screening assembly is therefore operative to substantially remove undesired matter from the crop being collected at the upper inlet end of the gravity feed chute 150.

Figures 7, 13, 16:
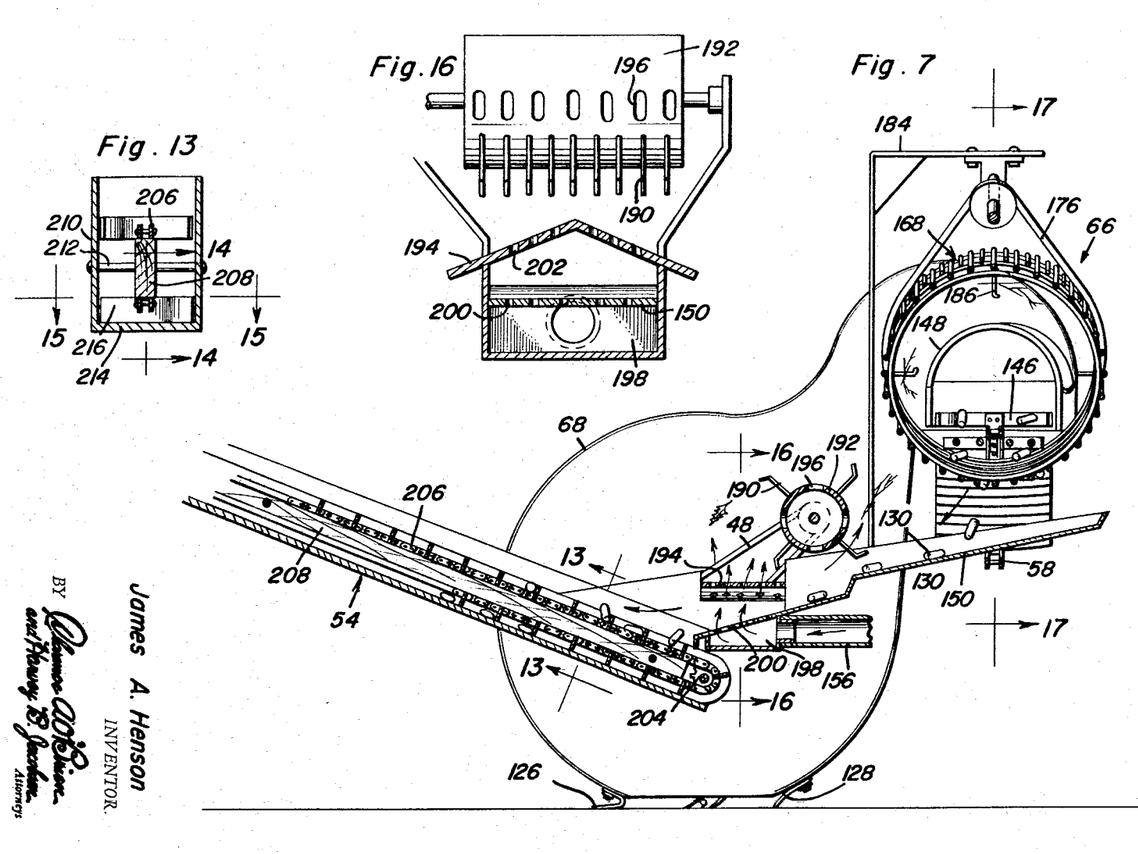
FIGURE 7 is an enlarged partial sectional view taken substantially through a plane indicated by section line 7—7 in FIGURE 1.
FIGURE 13 is an enlarged partial sectional view taken substantially through a plane indicated by section line 13—13 in FIGURE 7.
FIGURE 16 is an enlarged partial sectional view taken substantially through a plane indicated by section line 16—16 in FIGURE 7.

Referring now to FIGURE 7, it will be observed that as the crop is deposited into the gravity feed chute 150, it is fed downwardly toward the lower inlet end of the elevator 54. As the stream of material passes downwardly under the influence of gravity, it is combed by the radially extending fingers 190 which project from a combing drum 192 driven in a counterclockwise direction as viewed in FIGURE 7. Accordingly, larger sized particles such as sticks which remain mixed with the crop, are carried upwardly by the combing fingers 190 and deposited onto a slopping roof member 194 as more clearly seen in FIGURE 16. Thus, these larger particles will drop off the roof member and be discarded. Any nuts 130 carried with the larger particles by the combing fingers 190, will be returned to the chute 150 and toward this end, the combing drum is provided with openings 196 through which the nuts will fall. Also, in order to clear the roof member 194 of any debris deposited thereon by the combing fingers, an air pressure chamber 198 is formed therebelow and connected to the blower discharge conduit 156 so that an upward flow of air will proceed through the apertures 200 in the chute 150 and the apertures 202 in the roof member. It will therefore be apparent, that the crop free of undesirable material will be delivered to the elevator from the lower outlet end of the gravity feed chute 150.

Figure 14:
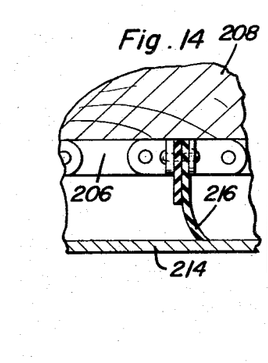
FIGURE 14 is an enlarged partial sectional view taken substantially through a plane indicated by section line 14—14 in FIGURE 13.
Figure 15:
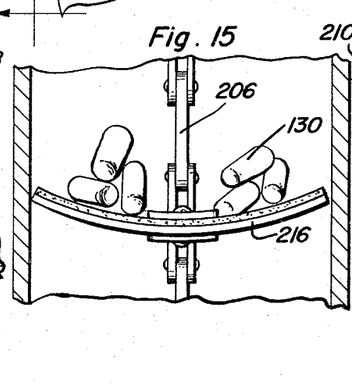
FIGURE 15 is an enlarged partial sectional view taken substantially through a plane indicated by section line 15—15 in FIGURE 13.

Referring now to FIGURES 7, 13, 14 and 15, it will be observed that the elevator includes a lower drive sprocket 204 about which a single conveyor chain 206 is entrained. Movement of the conveyor chain is guided along the upper and lower edges of an elongated guide member 208 centrally secured within a trough 210 by a plurality of fastener assemblies 212 in spaced relation above the bottom wall 214 of the trough. The spacing of the guide member 208 above the bottom wall is such as to bring the resilient pusher elements 216 into wiping engagement with the bottom wall causing them to flex as shown in FIGURE 14. It will also be noted, that the lower run of the conveyor chain moves upwardly through the trough so as to displace the crop along the bottom wall 214. Further, as shown in FIGURE 15, the pusher elements 216 are curved in such a direction so as to cause displacement of the crop toward the centrally mounted guide member 208 as it is conveyed upwardly along the bottom wall. In this manner crackage of the nuts is avoided since there is no tendency for the nuts to become wedged along the side walls of the trough. Further, because of the wiping engagement of the pusher elements with the bottom wall, there is no tendency for the nuts to become wedged between the pusher elements and the bottom wall. The crop is therefore discharged from the upper outlet end of the elevator through a swivelly mounted spout 218 into an unloading bin 220 as shown in FIGURE 2.

Figure 10:
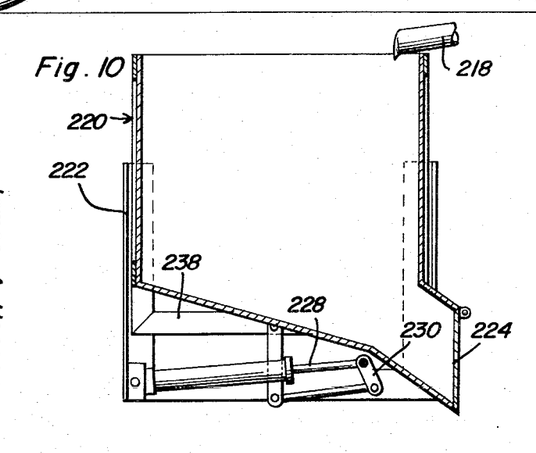
FIGURE 10 is an enlarged partial sectional view taken substantially through a plane indicated by section line 10—10 in FIGURE 2.
Figure 11:
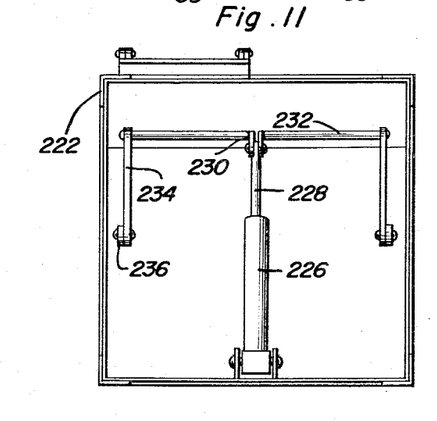
FIGURE 11 is an enlarged partial bottom view, as viewed from section line 11—11 in FIGURE 2.
Figure 12:
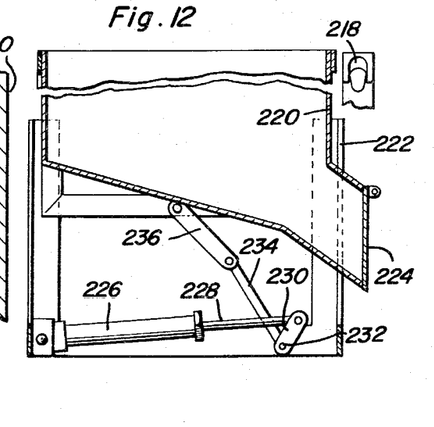
FIGURE 12 is a section view similar to FIGURE 10 but showing the receiving bin in another operative position.

Referring now to FIGURES 2, 10 and 11, it will be observed that the bin 220 is slidably mounted by four vertical angle members 222 so that it may be displaced from its lower position illustrated in FIGURES 2 and 10 to an upper position as illustrated in FIGURE 12. When displaced to its upper position, the bin will be above the upper outlet end of the elevator so that its spout 218 will be pivotally displaced out of the way. In the upper position, unloading of the bin through the unloading gate 224 will be facilitated. It will therefore be apparent, that when the harvester is operating, the bin will be in its lower position so that the height of the harvester will not be prescribed by the unloading requirements. In order to displace the receiving bin between its lower and upper positions, an actuating cylinder 226 is pivotally anchored by the supporting frame for the bin from which the piston rod 228 extends. The piston rod is pivotally connected to a lever arm 230 secured to a pivot shaft 232 to which the arms 234 are connected. The arms 234 are in turn connected by links 236 to the slide frame 238 which mounts the bin 220 for vertical sliding movement within the angle frame members 222. Accordingly, extension and retraction of the piston rod 228 will effect vertical displacement of the bin between its lower and upper positions. Any suitable valve controlled fluid supply (not shown) may therefore be connected to the cylinder device 226 in order to effect vertical displacement of the receiving bin.

From the foregoing description, the construction, operation and utility of the harvester will be apparent. In reviewing operation of the harvester, it will be recalled that the crop lying on the ground is rolled and otherwise urged upwardly into the pick-up assembly 38 by coaction between the rotor blades 112 and the one-way valve-like seal 128 inducing movement of the crop by both vacuum pressure and physical displacement. The crop is then deposited into the lateral conveyor 140 for movement across an air flow removing lighter particles. The crop is then deposited by the conveyor into a rotating screen drum 168 that also combs elongated particles into a discharge chute 188 for discard. The crop is then dropped through the screen portion of the screening drum as it moves axially through the drum in view of the tilted support thereof while undesired remaining particles are discarded at the exit end of the drum. The crop then drops into the gravity chute and passes under the rotating combing fingers which lift larger particles and deposit them onto an apertured roof from which the larger particles are discarded. Any crop being carried by the combing fingers with the larger particles are returned to the chute. An upward air flow through apertures in the roof clear it of any debris remaining thereon. The crop is then deposited into the lower end of the elevator 54 and carried upwardly for discharge into the receiving bin 220. While being conveyed by the lateral conveyor 140 and the elevator 54, crackage and damage to the crop is avoided by the particular constructional features of the conveyor and elevator including the curvature of the pusher elements secured to a single conveyor chain and the displacement of the crop along the bottom wall of the elevator trough by the pusher elements which wipingly engage the bottom wall. In addition to the foregoing features, the self-levelling and vertically adjustable mounting of the pick-up assembly 38 forwardly of the vehicle by means of which the harvester is propelled, enhances the efficiency of the pick-up assembly and reduces the likelihood of damage to the crop.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A harvesting machine for crops lying on the ground comprising, a vehicle adapted to move along the ground in a forward direction, a pick-up housing operatively mounted by the vehicle having an elongated inlet extending transversely of said forward direction, flexible means mounted by said housing along the inlet for wiping engagement with the ground to substantially seal the inlet over the ground, a rotor assembly rotatably mounted in the housing, said housing having an outlet circumferentially spaced from the inlet, flexible blade means mounted by the rotor assembly for sequential projection into the inlet and the outlet after wiping engagement with the housing, drive means connected to the rotor assembly for rotation thereof in one direction inducing displacement of solid matter engaged by the blade means in the inlet through the housing and out the outlet, conveyor means driven by said drive means for conveying said solid matter received from the outlet toward a discharge location, a hood enclosing a portion of the conveyor means adjacent the discharge location, blower means, air discharge means mounted within said hood and connected to the blower means for directing a flow of air through said conveyor means to remove light particles from said solid matter being conveyed through the hood, a tumbling drum mounted about said hood having at least two screening portions receiving the solid matter from the conveyor means for sequentially discharging solid matter within two size ranges, means for rotating said tumbling drum about an axis downwardly inclined toward said discharge location to induce movement of the solid matter along the screening portions, combing means mounted by the tumbling drum within one of the screening portions for removing larger particles from the solid matter, a spiral chute mounted on the hood in operative relation to the combing means for receiving the larger particles and discharging the same at the discharge location, a gravity feed chute mounted below said one of the screening portions of the tumbling drum for receiving the solid matter therefrom, a combing drum driven by the drive means and rotatably mounted within the gravity feed chute having fingers passing through the stream of solid matter being fed through the chute to displace larger particles therefrom, said combing drum having apertures through which smaller particles picked up by the combing fingers are returned to the stream of solid matter, an apertured roof element mounted in operative relation to the combing drum for deflecting particles deposited thereon, means connecting said blower means to the gravity feed chute below the apertured roof element for clearing particles deposited thereon by the combing drum in response to rotation thereof, an elevator having an inlet end operatively positioned below the gravity feed chute for receiving the stream of solid matter after passing beneath said apertured roof element, an unloading bin mounted by the vehicle rearwardly spaced from the pick-up housing, means for vertically displacing the bin between positions above and below an upper outlet end of the elevator, and a pivotally displaceable spout mounted at said outlet end of the elevator for discharging the solid matter into the bin when in the lower position thereof.

2. The combination of claim 1 wherein said elevator comprises, a trough having a bottom wall, a longitudinal guide member fixedly mounted in said trough spaced from the bottom wall, an endless conveyor mounted by the guide member, a plurality of flexible pushing elements mounted on the conveyor in wiping engagement with said bottom wall of the trough, and means for imparting movement to the conveyor in a direction upwardly moving said pushing element along the bottom wall, said pushing elements having a curvature tending to displace said solid matter toward the guide member in response to said movement of the conveyor.

3. The combination of claim 2 including a frame mounting the pick-up housing above the ground, a pair of laterally spaced castor wheel assemblies pivotally supporting the frame forwardly of the pick-up housing, vertically adjustable linkage means mounted by the vehicle rearwardly of the housing, swivel means pivotally connecting said linkage means to the frame about a horizontal axis extending between the castor wheel assemblies, and guide means mounted by the frame for engagement with the linkage means to guide lateral displacement of the frame relative to the vehicle about said horizontal axis.

4. The combination of claim 3 wherein said blade means includes, a plurality of rigid mounting members secured to the rotor assembly in axially spaced relation to each other, a primary blade element supported by the rigid mounting members for wiping engagement with the pick-up housing, a secondary blade element supported by said mounting members trailingly spaced from the primary element in the direction of rotation of the rotor assembly, said primary element being stiffer than the secondary element and said secondary element projecting radially beyond the primary element.

5. In a harvesting machine for crops lying on the ground, a vehicle adapted to move along the ground in a forward direction, a pick-up housing operatively mounted by the vehicle having a forward wall portion bordering an elongated inlet extending transversely of said forward direction, flexible seal means mounted by said housing along the inlet extending downwardly and rearwardly from the forward wall portion into wiping engagement with the ground, a rotor assembly rotatably mounted in the housing, said housing having an outlet circumferentially spaced from the inlet, flexible blade means mounted by the rotor assembly in wiping engagement with the housing including said forward wall portion for sequential projection into the inlet and the outlet and drive means connected to the rotor assembly for rotation thereof in one direction inducing displacement of solid matter engaged by the blade means in the inlet forwardly over said flexible seal means into the housing.

6. In a harvesting machine for crops lying on the ground, a vehicle adapted to move along the ground in a forward direction, a pick-up housing opertaively mounted by the vehicle having an elongated inlet extending transversely of said forward direction, flexible means mounted by said housing along the inlet for wiping engagement with the ground to substantially seal the inlet over the ground, a rotor assembly rotatably mounted in the housing, said housing having an outlet circumferentially spaced from the inlet, flexible blade means mounted by the rotor assembly for squential projection into the inlet and the outlet after wiping engagement with the housing and drive means connected to the rotor assembly for rotation thereof in one direction inducing displacement of solid matter engaged by the blade means in the inlet through the housing and out the outlet, said blade means including, a plurality of rigid mounting members secured to the rotor assembly, a primary blade element supported by the rigid mounting members for wiping engagement with the pick-up housing, a secondary blade element supported by said mounting members trailingly spaced from the primary element in the direction of rotation of the rotor assembly, said primary element being stiffer than the secondary element and said secondary element projecting radially beyond the primary element.

7. A harvesting machine for crops lying on the ground comprising, a vehicle adapted to move along the ground in a forward direction, pick-up means having an outlet through which solid matter from the ground is discharged, conveyor means mounted by the vehicle for conveying said solid matter received from the outlet toward a discharge location, a hood enclosing a portion of the conveyor means adjacent the discharge location, blower means, air discharge means mounted within said hood and connected to the blower means for directing a flow of air through said conveyor means to remove light particles from said solid matter being conveyed through the hood, a tumbling drum mounted about said hood having at least two screening portions receiving the solid matter from the conveyor means for sequentially discharging solid matter within two size ranges, means for rotating said tumbling drum about an axis downwardly inclined toward said discharge location to induce movement of the solid matter along the screening portions, combing means mounted by the tumbling drum within one of the screening portions for removing larger particles from the solid matter, a spiral chute mounted on the hood in operative relation to the combing means for receiving the larger particles and discharging the same at the discharge location and means for collecting the solid matter received from said one of the screening portions of the tumbling drum.

8. A harvesting machine for crops lying on the ground comprising, a vehicle adapted to move along the ground in a forward direction, pick-up means having an outlet through which solid matter from the ground is discharged, conveyor means for receiving said solid matter from the pick-up means and delivering the same to a discharge location, a gravity feed chute mounted below said discharge location of the conveyor means, a combing drum rotatably mounted within the chute having fingers passing through the stream of solid matter being fed through the chute to displace larger particles therefrom, said combing drum having apertures through which smaller particles picked up by the combing fingers are returned to the stream of solid matter, an apertured roof element mounted in operative relation to the combing drum for deflecting particles deposited thereon, blower means, means connecting said blower means to the gravity feed chute below the apertured roof element for clearing particles deposited thereon by the combing drum in response to rotation thereof, an elevator having an inlet end operatively positioned below the gravity feed chute for receiving the stream of solid matter after passing beneath said apertured roof element, and means connected to an upper outlet end of the elevator for discharging the solid matter into a receiving bin.

9. In a harvesting machine for crops lying on the ground, a vehicle adapted to move along the ground in a forward direction, a pick-up housing operatively mounted by the vehicle having an elongated inlet extending transversely of said forward direction, pick-up means operatively mounted within said housing, a frame mounting the pick-up housing above the ground, a pair of laterally spaced caster wheel assemblies pivotally supporting the frame forwardly of the pick-up housing, vertically adjustable linkage means mounted by the vehicle rearwardly of the housing, swivel means pivotally connecting said linkage means to the frame about a horizontal axis extending between the caster wheel assemblies, and guide means mounted by the frame for engagement with the linkage means to guide lateral displacement of the frame relative to the vehicle about said horizontal axis.

10. In a harvesting machine for crops lying on the ground, a vehicle adapted to move along the ground in a forward direction, a pick-up housing mounted by the vehicle in close spaced relation above the ground, a flexible seal element connected to the housing and extending rearwardly therefrom into wiping engagement with the ground, a rotor assembly rotatably mounted within the housing, and flexible blade means projecting from the rotor assembly into wiping engagement with the housing for displacing the crop onto the flexible element and into the housing.

11. The combination of claim 10 wherein said blade means includes, a plurality of rigid mounting members secured to the rotor assembly, a primary blade element supported by the rigid mounting members for wiping engagement with the pick-up housing, a secondary blade element supported by said mounting members trailingly spaced from the primary element in the direction of rotation of the rotor assembly, said primary element being stiffer than the secondary element and said secondary element projecting radially beyond the primary element.

12. The combination of claim 5 wherein said flexible means comprises a flap element forming a continuing extension of the forward wall portion of the housing.

13. The combination of claim 5 wherein said blade means includes a flexible blade element continuously extending transversely across the inlet and outlet and having slits formed therein to accommodate non-uniform flexing without any gaps through which the crops may pass.

References Cited

UNITED STATES PATENTS

| | | | |
|---|---|---|---|
| 1,272,665 | 7/1918 | Isom | 56—126 |
| 2,481,652 | 9/1949 | Fort | 56—126 |
| 2,652,678 | 9/1953 | Ramacher | 56—328 |
| 2,716,856 | 9/1955 | Burns | 56—30 |
| 2,780,904 | 2/1957 | Bowie et al. | 56—328 |
| 3,021,661 | 2/1962 | Couberly | 56—364 |
| 3,221,483 | 12/1965 | Ronning | 56—364 |
| 3,308,612 | 3/1967 | Oblinger | 56—364 |

RUSSELL R. KINSEY, *Primary Examiner.*